Oct. 5, 1937.   J. N. BROWNING   2,095,025
PULLEY
Filed July 5, 1934   2 Sheets—Sheet 1

INVENTOR
JOHN N. BROWNING
BY
Brockett, Hyde, Higley & Meyer
ATTORNEYS

*INVENTOR*
JOHN N. BROWNING
BY
Brockett, Hyde, Higley & Mey
*ATTORNEYS*

Patented Oct. 5, 1937

2,095,025

UNITED STATES PATENT OFFICE 2,095,025

PULLEY

John N. Browning, Maysville, Ky., assignor to Rockwood Manufacturing Company, a corporation of Indiana Application July 5, 1934, Serial No. 733,840

6 Claims. (Cl. 74—230.8)

This invention relates to pulleys having multiple grooved faces and built up of a number of parts.

The general objects of the invention are to provide such a pulley of as little weight and as inexpensively as possible, and largely employing for the purpose sheet metal stampings, although employing also where desirable, castings of minimum size and particularly, in one form, employing a die-casting.

A particular object of the invention is to provide such a pulley whose parts in assembly will comprise a rigid unit, the sheet metal parts being so braced against strain that they may be of light gauge. The invention includes the employment of spacers for the purpose, arranged to back the sheet metal parts, and the invention also embraces a swaging or spinning operation applied to a die-casting as will appear.

Figure 1:
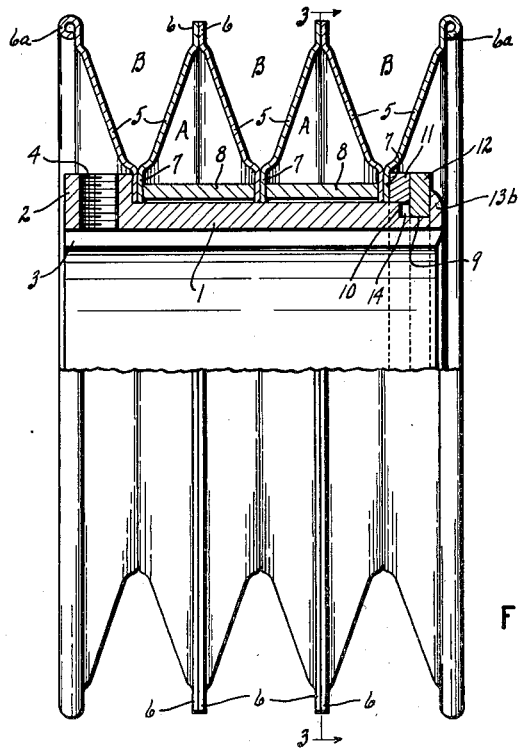
Figure 2:
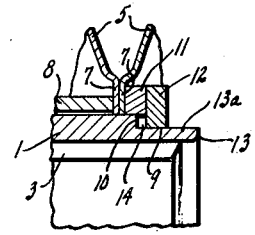
Figure 3:
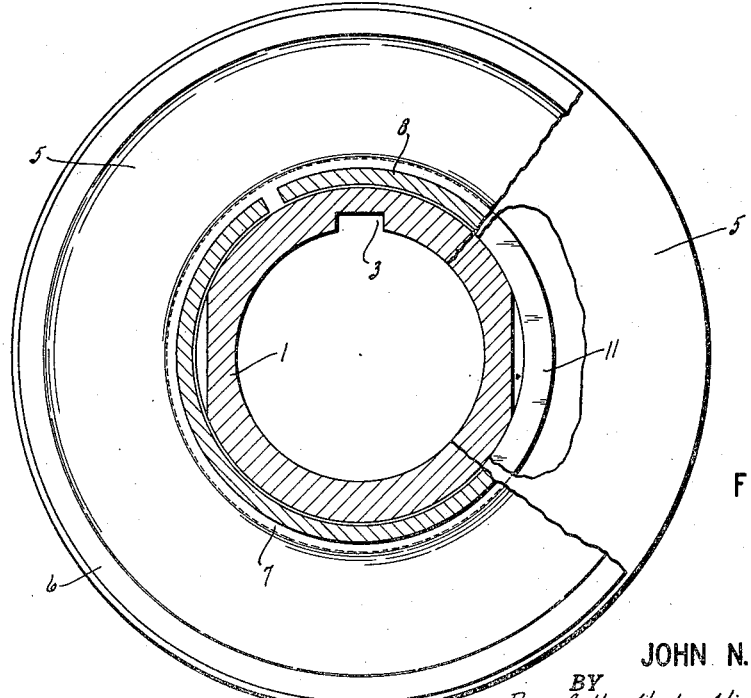
Figure 4:
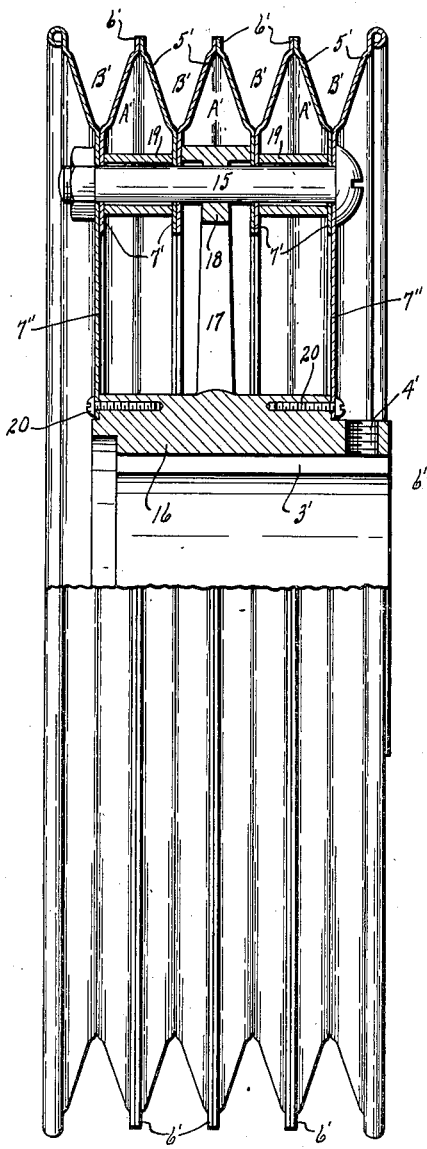
Figure 5:
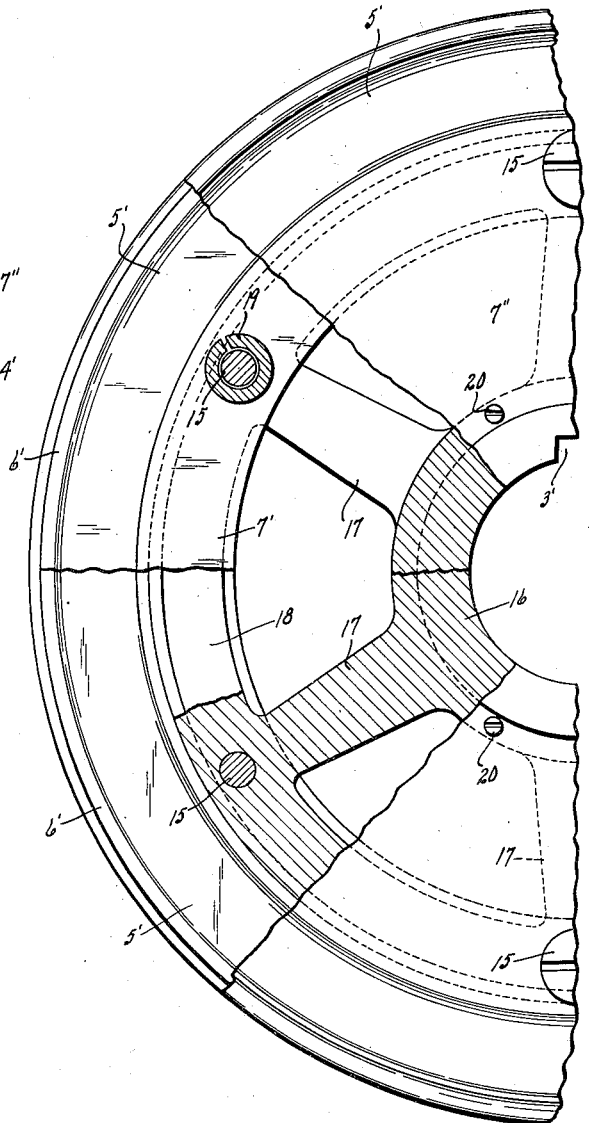

The exact nature of this invention together with further objects and advantages thereof will be apparent from the following description taken in connection with the accompanying drawings, in which Fig. 1 is a side view of an embodiment of the invention; Fig. 2 is a sectional detail of parts appearing in Fig. 1, shown, however, as before completion of the assembly of Fig. 1; Fig. 3 is a transverse section in the plane of line 3—3, Fig. 1; Fig. 4 is a side view of another embodiment; and Fig. 5 is an end view of the pulley shown in Fig. 4, parts being broken away in all but Fig. 2 of the drawings to show details of construction.

With reference now to the drawings and first to Figs. 1, 2 and 3 thereof, 1 is a hub member generally cylindrical as indicated, having at one end an annular flange part 2 and shown as provided with a longitudinally coextensive keyway 3, and a threaded set screw opening 4 located at the flange part 2.

A plurality of annular generally discuate facing members of pressed metal or the like, are arranged in stacked relation upon the hub member 1, as indicated in Fig. 1, each facing member having an annular conical part 5 with a peripheral transversely disposed flange part 6 and an inner transversely disposed flange part 7 bearing upon the hub 1.

Thus is provided, concentric with the hub, a multiple grooved pulley face part, having alternate inner cavities A and outer belt-receiving cavities B, all annular and concentric. The outer flanges 6a of the outermost members of the stack, are preferably turned or spun under as indicated, Fig. 1, to avoid raw edges and to provide added strength as will appear. The remaining flanges 6 and 7 of the discuate members are flat, in transverse planes, as in Fig. 1, so as to provide maximum endwise bearing between members with minimum longitudinal overall dimension.

At each inner annular cavity A is provided a spacer ring 8 arranged about the hub member 1 and bearing between the adjacent inner flanges 7 of the corresponding pair of discuate members. These spacing rings 8 need not be endless but instead may be open as indicated in Fig. 3 and thus cheaply formed of strap metal or the like.

To complete the pulley there remains only to provide means for maintaining the described stack of parts upon the hub. For this purpose, the hub end opposite its head end 2, is annularly undercut on its outer surface, as at 9, providing a shoulder 10. Ring means are provided on the hub to overlie the shoulder 10 and bear against the adjacent end pulley facing member, at the inner flange part 7 of the latter. As indicated in the drawings the ring means comprises a pair of rings 11 and 12, the ring 11 longitudinally extending in both directions from the shoulder 10 and bearing upon the hub member 1 at the larger diameter of the latter. The ring member 12 abuts the ring member 11, by which it is caused to clear the shoulder 10, and is of smaller inner diameter, to bear upon the reduced end part 9 of the hub, which latter hub part extends substantially beyond the ring 12 as indicated in Fig. 2. The ring members 11 and 12 might be integral with each other, but their described separateness from each other is preferable for manufacturing reasons, as that they may be made from bar stock in a manner similar to that providing the spacing rings 8.

It will be apparent that when the hub member end is as indicated in Fig. 2, all of the described annular parts may be assembled thereon endwise toward the head 2 of the hub.

After the assembly is thus made, the small end extremity 13 of the hub is turned or spun outwardly from the position indicated at 13a in Fig. 2, to the position indicated at 13b in Fig. 1, against the ring member 12 whereby all of the parts mounted on the hub are clamped endwise in their stacked relation, between the head 2 at one end of the hub and the flange or lip formed at 13b on the opposite end of the hub. The spacer members 8 prevent collapse of the pulley facing members at their inner openings A, under the clamping pressure which may thus be very substantial. Since the part 11 of the ring provides a clearance 14 adjacent the shoulder 10 of the hub, there can be no bearing of the part 12 of the ring against the shoulder and the described clamping action is effective to secure the discuate facing members in driving relation with the hub. The beads formed at 6a reinforce the end facing members against deformation under pressures exerted by belts in the end grooves B of the pulley.

The described construction provides a very satisfactory multiple grooved pulley at very little cost, all of the parts being very cheaply and easily produced, the facing members of light gauge sheet metal, the spacing and ring members of standard bar or strip stock, and the hub member a simple die-casting. The resulting pulley is of minimum weight yet of ample strength.

The described construction illustrated in Figs. 1–3, is particularly adapted for pulleys of small diameter. A preferred construction for pulleys of larger diameters is illustrated in Figs. 4 and 5.

With reference now to these two figures, the construction is somewhat as before. A stack of generally annular discuate conical pulley facing members is provided, to form alternate inner and outer annular cavities A' and B' respectively, as indicated in Fig. 4. The facing members are of large diameter as indicated, each having a conical part 5', a peripheral flange 6' generally as before and each having an inner flange 7' of considerable radial dimension. These inner flanges 7' are perforated at points spaced about the stack to receive longitudinally extending clamping rivets or bolts 15, six being indicated. A supporting and driving member is provided for the stack, having a central hub part 16, here shown as having arms 17 radially extending therefrom, and to a rim part 18. The peripheral part 18 of the supporting member, has width or thickness to extend longitudinally as a spacer between the inner flange parts 7' of an adjacent pair of pulley facing members at one of the inner annular spaces A', and has openings to receive the bolts 15. At the other annular spaces A' of the stack, spacing rings 19 are provided about the bolts 15, said rings being of open form, as shown in Fig. 5, so that such rings, like the spacing rings 8, may be cheaply formed of strap metal or the like.

It will be quite apparent that when the assembly is complete, and the bolts tightened, the stack of pulley facing members will be firmly clamped together and at the same time secured with the supporting and driving member and hence with the hub part 16 of the latter, thus forming a complete multiple grooved pulley.

The hub part 16 may be of whatever form is desired. As shown it is provided with a keyway 3' and set screw opening 4'.

That the parts intermediate the hub and pulley face may be enclosed as to prevent accumulations in the inner cavities A', the inner flanges 7'' of the outermost pulley facing members of the stack, are extended inwardly as indicated in Fig. 4, to the hub 16, where they may be secured as by screws 20, suitable shoulders being preferably provided on the hub to fit the flanges 7'' as indicated.

It will be apparent that the desired construction provides a pulley of large diameter yet with the advantages described for the smaller diameter pulley of Figs. 1–3. In this large pulley, the supporting member is the only casting required and it is of minimum mass, the remaining parts being largely of pressed metal and in any event easily and cheaply provided from stock materials.

What I claim is:

1. In a pulley of the class described, a hub member, a plurality of discuate facing members arranged in stacked relation thereupon, said hub member having a head at one end of the stack to provide a backing for the latter, said hub member having, at the other end of the stack, an annular depression providing a shoulder adjacent the corresponding stack end, ring means disposed about said hub member to extend longitudinally beyond said shoulder in both directions and arranged to provide a clearance from said shoulder therebeyond, said hub member having an end part outwardly turned to engage said ring means, whereby to clamp said stack of facing members endwise upon said hub member.

2. A pulley of the class described, comprising a plurality of thin discuate members each having an inclined annular body part and inner and outer transversely disposed annular peripheral flange parts, said members being removably arranged in stacked relation with their inclined body parts having alternate directions of slope to provide a multiple grooved pulley face, each of the inner members of said stack having substantial endwise bearing at their inner and outer flange parts with the corresponding flange parts of the next adjacent members, spacing means adjacent the body parts of said members and removably arranged between adjacent pairs of the inner contacting flange parts thereof, pulley hub means free of connection with at least the outer or end spacing means, and means inter-associating the inner flange parts of all of said members to releasably clamp such members in such stacked relationship.

3. A pulley of the class described, comprising a plurality of thin discuate members each having an inclined annular body part and inner and outer transversely disposed annular peripheral flange parts, said members being removably arranged in stacked relation with their inclined body parts having alternate directions of slope to provide a multiple grooved pulley face, each of the inner members of said stack having substantial endwise bearing at their inner and outer flange parts with the corresponding flange parts of the next adjacent member, spacing means of split ring form adjacent the body parts of said members and removably arranged between adjacent pairs of the inner contacting flange parts thereof, pulley hub means free of connection with at least the outer or end spacing means, and means inter-associating the inner flange parts of all of said members to releasably clamp such members in such stacked relationship.

4. A pulley of the class described, comprising a plurality of pairs of relatively thin discuate members, each such member having an annular inclined body portion and two radially extending annular flanges, one of said flanges being an inner peripheral flange and the other being an outer peripheral flange, said pairs of members being arranged in stacked relationship with the inclined body portions of each pair having alternate directions of slope and with the inner peripheral flanges of each pair of members in contact and with the outer peripheral flanges of each pair of members in contact with the outer peripheral flanges of the adjacent pairs of members, thereby providing alternate inner and outer annular cavities, the outer cavities constituting belt-receiving grooves, bolt means extending transversely through the inner peripheral flanges of said pairs of members for maintaining said members in such stacked arrangement, spacing means in each of said inner cavities extending between the inner peripheral flanges of the two members by which such cavity is formed, hub means for the pulley, and supporting means inter-connecting said hub means and an intermediate one of said spacing means, said hub means being free of connection to said other spacing means.

5. A pulley of the class described, comprising a plurality of pairs of relatively thin discuate members, each such member having an annular inclined body portion and two radially extending annular flanges, one of said flanges being an inner peripheral flange and the other being an outer peripheral flange, said pairs of members being arranged in stacked relationship with the inclined body portions of each pair having alternate directions of slope and with the inner peripheral flanges of each pair of members in contact and with the outer peripheral flanges of each pair of members in contact with the outer peripheral flanges of the adjacent pairs of members, thereby providing alternate inner and outer annular cavities, the outer cavities constituting belt-receiving grooves, bolt means extending transversely through the inner peripheral flanges of said pairs of members for maintaining said members in such stacked arrangement, spacing means in each of said inner cavities extending between the inner peripheral flanges of the two members by which such cavity is formed, hub means for the pulley, and supporting means inter-connecting said hub means and an intermediate one of said spacing means, the inner peripheral flanges of the outermost members in such stacked arrangement being of increased radial extent and being connected to said hub means, thereby providing spaced and generally parallel closed side walls for said pulley.

6. A pulley of the class described, comprising a plurality of pairs of relatively thin discuate members, each such member having an annular inclined body portion and an annular radially extending inner peripheral flange, said pairs of members being arranged in stacked relationship with the inclined body portions of each pair having alternate directions of slope and with the inner peripheral flanges of each pair of members in contact, thereby providing outer annular belt-receiving grooves, bolt means extending transversely through the inner peripheral flanges of said pairs of members for maintaining said members in such stacked arrangement, hub means for the pulley, and supporting means inter-connecting said hub means and said bolt means, the inner peripheral flanges of the outermost members in such stacked arrangement being of increased radial extent and being connected to said hub means, thereby providing spaced and generally parallel closed side walls for said pulley.

JOHN N. BROWNING.